2,760,944

AMINO-AMIDE-EPOXY COMPOSITIONS

Sylvan Owen Greenlee, Racine, Wis., assignor to Devoe & Raynolds Company, Inc., Louisville, Ky., a corporation of New York No Drawing. Application March 17, 1952,
Serial No. 277,073

12 Claims. (Cl. 260—18)

This invention relates to new complex amino-amide-epoxide compositions, and more particularly to such compositions capable of conversion into insoluble, infusible products, and valuable for use in making varnishes and protective coatings, in making molding compositions and articles, as adhesives, and in making films and fibres, etc. The invention includes various new amino-amide-epoxy compositions and reaction products and articles and products made therefrom.

The new amino-amide-epoxy compositions and products are made by reacting amino-amides with complex epoxides produced by the reaction of polyhydric phenols with polyfunctional halohydrins or with polyepoxides to form complex reaction products containing terminal epoxide groups. Such epoxide products with which the amino-amide is reacted are advantageously complex polymeric products resulting from the reaction of polyhydric phenols with polyfunctional halohydrins or polyepoxides in proportions to give terminal epoxide groups in the polymeric reaction products. Such complex epoxide products and compositions are described in my applications Serial Nos. 199,931 (now Patent No. 2,615,007); 250,951 (now Patent No. 2,615,008) and 626,449 (now Patent No. 2,592,560).

One of the objects of the present invention is the production of infusible and insoluble reaction products of complex epoxides and amino-amides in suitable proportions which have remarkable chemical resistance combined with hardness, toughness, flexibility, lack of contraction on conversion, and other desirable properties.

Another object of the invention is the production of amino-amide-epoxide compositions capable of use as raw materials for the production of such conversion products.

Another object of the invention is the production of amino-amide-epoxide compositions which on conversion result in cross-linking of the complex epoxides through reaction of active hydrogens of the amino-amide with epoxide groups.

Another object of the invention is the production of fusible amino-amide-epoxy compositions and reaction products useful for various purposes and still containing epoxy groups capable of further reaction.

Another object of the invention is the production of compositions and reaction products of polyepoxides with an amino-amide in proportions giving final infusible products of remarkable chemical resistivity and other desirable properties.

Another object of the invention is the production of solutions of such amino-amide-epoxy compositions for use in making varnishes and protective coatings, impregnating solutions, films, filaments, etc.

Another object of the invention is the production of molding mixtures and compositions capable of conversion into infusible, molded articles and products, and the articles and products so produced.

Other objects of the invention and the nature and advantages of the invention will further appear from the following more detailed description.

In my companion applications Serial No. 199,931 (now Patent No. 2,615,007) and 250,951 (now Patent No. 2,615,008), I have described complex, polymeric reaction products of polyhydric phenols with polyfunctional halohydrins such as epichlorhydrin and glycerol dichlorhydrin, with the difunctional chlorhydrin used in proportions in excess of that equivalent to the polyhydric phenol and less than twice the equivalent amount, by carrying out the reaction with the addition of caustic alkali equal to or somewhat in excess of the amount required to combine with the halogen of the halohydrin and giving complex, polymeric products containing both terminal epoxy groups and terminal primary hydroxyl groups, and with the epoxy groups in general considerably in excess of the terminal primary hydroxy groups. Such complex, polymeric epoxy-hydroxy products and compositions are advantageously used for reaction with amino-amides to form the new amino-amide-epoxy compositions and products of the present invention.

In my companion application Ser. No. 250,951 (now Patent No. 2,615,008) and in my Patent No. 2,582,985, I have described epoxy-hydroxy compositions resulting from the reaction of a polyhydric phenol with a polyfunctional halohydrin such as epichlorhydrin in approximate proportions of 2 mols of epichlorhydrin to one of dihydric phenol to give resinous products containing both terminal epoxy and hydroxy groups with the proportion of terminal epoxy groups consideraby in excess of the terminal hydroxy groups. Such epoxy-hydroxy compositions are also advantageously used in forming the new amino-amide-epoxy compositions and products of the present invention.

In my companion application Serial No. 626,449 (now Patent No. 2,592,560), I have described new polyepoxy products and compositions obtained by the direct addition of polyhydric phenols with polyepoxides and with the proportion of polyepoxides reacting with the polyhydric phenols in excess of the equivalent amount so that the resulting reaction products will contain terminal epoxy groups. Such polyepoxy reaction products, and particularly complex, polymeric, polyepoxy reaction products, are advantageously used in making the new amino-amide-epoxy compositions and products of the present invention.

Such complex epoxides are polymeric polyethers of polyhydric phenols and particularly of dihydric phenols having alternating phenol residues and aliphatic groups, including hydroxyl-containing intermediate aliphatic groups and epoxide-containing terminal aliphatic groups and in general are free from functional groups other than hydroxyl and epoxide groups.

Various amino-amides are useful in making the new amino-amide-epoxy compositions and products. Apparently all hydrogens directly attached to nitrogen of both the amino and amide groups are active hydrogens in reacting with epoxide groups, but the amino hydrogens appear to be more reactive than the amide hydrogens. With some amino-amides, it is advantageous to use a catalyst, particularly if high molecular weight, infusible products are obtained.

The amino-amides are carboxylic acid amides or polyamides containing one or more free amine groups and containing at least three active hydrogens per molecule which are directly attached to nitrogen. Amino-amides and amino-polyamides made from carboxylic acids and polyamines are particularly advantageous, the acids used for making the amino-amides being either monobasic carboxylic acids, or dibasic carboxylic acids, e. g. adipic acid.

Amino-amides derived by the partial amidification of ethylenediamine, or polyethylene polyamines, with organic carboxylic acids, including higher unsaturated fatty acids, and resin acids, e. g. abietic acids, and other acids derived from oils and fats, are advantageously reacted with the complex epoxides to give valuable amino-amide-epoxy reaction products. Such amino-amides, when made from resin acids and higher unsaturated fatty acids, impart modified properties to the composition made therewith due to the modifying action of the high molecular weight acids used. Thus, amino-amides of drying oil acids, such as linseed oil acids, may impart desirable drying properties to compositions made therewith.

The amino-amides can thus be made from ethylene diamine and polyethylene polyamines by reacting these amines with monocarboxylic or dicarboxylic acids to form amides or polyamides, including polymeric straight chain amino-polyamides, and to give amino-amides or aminopolyamides having both one or more free amine groups and one or more amide groups. Where high molecular weight acids, such as resin acids and higher fatty acids derived from fats and oils, are used, e. g., drying oil acids or dibasic high molecular unsaturated acids, the aminoamides formed are modified by the presence of the high molecular weight acid groups in the final compositions.

When the amino-amides are reacted with the complex epoxides, the amine groups of the amino-amides appear to be more reactive and to react at lower temperatures, or more rapidly with the epoxide groups than do the amide groups. This initial reaction of the amino groups appears to be followed by a slower reaction, or a reaction at a higher temperature, with the amide groups or with the amide hydrogen of the amide groups.

The complex epoxide compositions used with the aminoamide are themselves capable of polymerization by reaction of epoxy groups with hydroxyl groups, particularly in the presence of small amounts of a catalyst. The complex epoxy compositions made from polyhydric phenols and epichlorhydrin contain both terminal epoxy groups and terminal primary hydroxyl groups and, in general, the number of terminal epoxy groups is considerably in excess of the number of terminal primary hydroxyl groups. In polymeric products containing intermediate hydroxyl groups, the total number of hydroxyl groups may be considerably in excess of the number of epoxy groups. Polymerization of such complex epoxy-hydroxy compounds may take place through terminal epoxy and primary hydroxy groups to form long chain polymers or through terminal epoxy groups and intermediate hydroxyl groups to form polydimensional polymers.

In the case of polyepoxides made by the direct reaction of bis phenol with an excess of polyepoxide there will also be hydroxyl groups, and, in the case of polymeric products, the number of hydroxyl groups may be in excess of the terminal epoxy groups. Such products are capable of polymerization by reaction of terminal epoxide groups with intermediate hydroxyl groups to form complex, polydimensional polymers, particularly when a catalyst is used.

When such complex epoxide compositions are reacted with amino-amides, particularly when catalysts are used, the action may be one of the direct addition through epoxide groups and it may be in part the reaction of epoxy and hydroxyl groups to form ether linkages, particularly where the amino-amide is used in less than equivalent proportion such that there is insufficient amino-amide to react with all of the epoxide groups.

The complex epoxide compositions which are reacted with the amino-amide are resinous products which can be made of varying melting points, epoxide content, and degree of polymerization from soft resins to harder resins of higher melting point. In general, these resins are soluble, unless too highly polymerized, in solvents such as acetone, methyl ethyl ketone, diacetone alcohol, cyclohexanone, etc. and can be used in solution with the addition of the amino-amide with or without catalyst, as the case may be, in forming liquid compositions for use e. g. in making clear or pigmented varnishes, in making transparent films and filaments, and in impregnating wood, fabrics and other porous material, etc.

The reaction of the amino-amide with such complex epoxides appears to be one of cross-linking the complex epoxide molecules through reaction of the amino-amide with epoxide groups. But such cross-linking reaction may be combined with a simultaneous polymerization reaction between epoxide and hydroxyl groups, particularly when the amino-amide is used in less than equivalent proportion.

When polyepoxides are reacted with the amino-amide and where the polyepoxides contain only or mainly terminal epoxide groups with intermediate hydroxyl groups, the action of the amino-amide is such that considerably less than the equivalent amount of amino-amide will react with the polyepoxide to form infusible products; while the epoxide groups which are present in excess of those reacting with the amino-amide may react to a greater or less extent with hydroxyl groups, in which case the complex epoxy-amino-amide reaction product may have the polyepoxides united in part through amino-amide cross-linking and in part through epoxy-hydroxide reaction to form ether linkages.

Similarly in the case of the complex polymeric epoxides which also contain terminal hydroxyl groups, the final hardening operation, particularly when less than the equivalent amount of the amino-amide is used, may be in part cross-linking through the amino-amide and in part by polymerization through epoxy-hydroxy reactions to form ether linkages.

The complex epoxides and polyepoxides used for reacting with the amino-amide may themselves be carried to a high degree of polymerization in which case only a small amount of amino-amide may be necessary to convert the highly polymerized epoxides into an infusible state. With products of lower melting point and lower degree of polymerization an increased amount of cross-linking or polymerization in the presence of the amino-amide, or a large proportion of amino-amide, may be necessary to give the final insoluble product.

In referring to equivalent amounts of amino-amide and of the complex polyepoxides, each active hydrogen attached to nitrogen of the amino-amide is considered equivalent to one epoxide group. The equivalent weight of the amino-amide is the weight which will contain one such active amino-amide hydrogen when used with an equivalent weight of the complex epoxides containing one epoxide group.

The epoxide equivalent of the complex epoxides used can be determined for practical purposes by determining the equivalent weight of the composition per epoxide group.

The epoxide content of the epoxide-hydroxy compositions hereinafter indicated were determined by heating a 1 gram sample of the epoxide composition with an excess of pyridine hydrochloride (made by adding 16 cc. of concentrated hydrochloric acid per liter of pyridine) at the boiling point for 20 minutes and back titrating the excess pyridine-hydrochloride with 0.1 N sodium hydroxide using phenolphthalein as indicator, and considering the 1 HCl is equal to 1 epoxide group.

The following table gives illustrative examples of hydroxy-epoxy compositions resulting from the reaction of bis phenol with varying proportions of epichlorhydrin with the use of caustic soda according to said companion applications, the table giving the softening points of the resin, the equivalent weight to epoxide as determined by the above method, and the average molecular weight, in the case of the lower melting resins, as determined by the boiling point method.

| Example | Softening Point (Durrans Mercury Method), °C. | Equivalent Weight to Epoxide | Average Molecular Weight |
| --- | --- | --- | --- |
| I | 43 | 325 | 451 |
| II | 84 | 591.5 | 791 |
| III | 90 | 730 | 807 |
| IV | 100 | 860 | 1,133 |
| V | 121 | 1,248 | |
| VI | 132 | 1,158 | |
| VII | 146 | 3,155 | |

The complex epoxides in this table were made from the reaction of bis phenol and epichlorhydrin in varying proportions with the use of aqueous caustic alkali sufficient to combine with all of the chlorine of the epichlorhydrin or somewhat in excess thereof. Other complex epoxides can similarly be made from other polyhydric phenols which are similarly capable of reacting with amino-amides although the properties of the different complex epoxides will vary somewhat with different polyhydric phenols used and with different proportions of phenol and epichlorhydrin and with different degrees of polymerization.

*Example VIII*

A complex epoxide was prepared from 6 mols of hydroquinone and 7 mols of epichlorhydrin with 7.5 mols of aqueous caustic soda, which had a softening point of 92° C. and an equivalent weight to epoxide of 1105.

*Example IX*

An epoxide composition was prepared from 6 mols of resorcinol and 7 mols of epichlorhydrin with 7.76 mols of aqueous sodium hydroxide, which had a softening point of 80° C. and an equivalent weight to epoxide of 1146.

The foregoing examples illustrate complex epoxy-hydroxy compositions such as are described in my companion applications Serial Nos. 199,931 and 250,951. Likewise, complex epoxides may be prepared from the further reaction of such complex epoxy-hydroxy compounds with polyhydric phenols used in amounts less than that which is equivalent to the epoxide content. Thus the complex epoxides of Examples I to IX can be further reacted with limited amounts of polyhydric phenols to give complex epoxides of higher molecular weight which are useful in reactions with amino-amides according to the present invention, such further reaction products being described in said companion applications.

The complex epoxides which are useful for reaction with amino-amides also include complex polyepoxides such as are described in my companion application Serial No. 626,449 made by reacting polyhydric phenols with simpler polyepoxides to give complex polyepoxides. The simpler polyepoxides used for reacting with polyhydric phenols and amino-amides include new polyepoxides more particularly described in Examples I and II of said companion application Serial No. 626,449 and which are briefly described in Examples X and XI.

*Example X*

The polyepoxide is produced by reacting 3 mols of glycerine with 9 mols of epichlorhydrin using boron trifluoride as a condensing agent and finally treating the resulting reaction product with sodium aluminate to give a polyepoxide in the form of a pale yellow product having an epoxide equivalent of 149 and an average molecular weight as determined by the standard boiling point elevation method of 324, representing an average of 2.175 epoxide groups per molecule, assuming the determined molecular weight is the molecular weight.

*Example XI*

A polyepoxide composition is similarly prepared from 1 mol of trimethylol propane and 3 mols of epichlorhydrin condensed with boron trifluoride and finally treated with sodium aluminate to give a pale yellow liquid having an equivalent weight to epoxide of 151 and an average molecular weight of 292.2, corresponding to approximately 1.94 epoxide groups per molecule, assuming an average molecular weight.

Other new polyepoxy products can similarly be made from other polyhydric alcohols containing 3 or more hydroxyl groups as described in said companion application Serial No. 626,449.

The preparation of new complex epoxides by the reaction of simpler polyepoxides with polyhydric phenols is illustrated by the following Examples XII to XVI.

*Example XII*

An epoxide composition was prepared by heating 0.3 mol of diglycid ether with 0.2 mol of bis phenol at 190–215° C. for 1½ hours to give a product softening at 89° C. and having an equivalent to epoxide of 1460.

*Example XIII*

To 29.8 parts of the product of Example X was added 11.4 parts of bis phenol and this mixture was heated gradually to 173° C. and held at 162–173° C. for 2 hours. The resulting product was a viscous, tacky syrup having an epoxide equivalent of 479.

*Example XIV*

To 4.6 parts of bis phenol and 4.3 parts of diglycid ether was added 0.032 part of 20% sodium hydroxide and the resulting mixture heated for 45 minutes at 100° C. to give a semisolid material containing one epoxide group per 371 parts.

*Example XV*

To 7.5 parts of p,p'-dihydroxy diphenyl sulfone and 7.5 parts of diglycid ether was added 0.006 part of sodium hydroxide and the resulting mixture was heated for 86 minutes at 100° C. to give a product containing 1 epoxide groups per 315 parts.

*Example XVI*

To 50 parts of the product of Example XI was added 19 parts of bis phenol and the resulting mixture was heated for 2 hours and 10 minutes at 162 to 186° C. to give a soft tacky resin having an epoxide equivalent of 440 and a molecular weight of 828.

The foregoing Examples I to XVI illustrate various complex epoxides which can be reacted with the amino-amides in making the new amino-amide-epoxy composition.

The following examples illustrate the new compositions containing the complex epoxides and amino-amides. The amino amides furnish active hydrogens in the amine groups, as well as in the amide groups, for coupling with the epoxide groups, although only part of the active hydrogens may so react. Thus, where one mol of an acid is reacted with one mol of a diamine or polyamine, such as ethylene diamine and polyethylene polyamines, the resulting amide will contain one or more free amine groups. Such amine groups contain active hydrogen which is reactive with epoxides, and in general the amine hydrogen reacts first, or is more reactive than the amide hydrogen. Thus, in the case of an amino-amide containing one amino group and one amide group, there are three active hydrogens, two on the amino group and one on the amide group.

The following examples illustrate the use of such amino-amides with epoxides in producing the new compositions.

*Example XVII*

A mixture of 730 parts of the product of Example III and 100 parts of an amino-amide prepared from the reaction of equimolar portions of oleic acid and diethylene triamine was dissolved in methyl ethyl ketone to give 50% solids. Thin films spread from this solution when baked for ½ hour at 150° C. or air dried over night gave flexible, infusible films.

*Example XVIII*

Likewise a 50% solution of a mixture of 440 parts of the product of Example XVI, 114 parts of an amino-amide prepared from equimolar parts of rosin (acid value of 160) and diethylene triamine and 22 parts of sodium phenoxide gave infusible films when baked for ½ hour at 110° C. or air dried overnight.

*Example XIX*

A mixture of 730 parts of the product of Example III and 117 parts of an amino-amide prepared by the reaction of equimolar proportions of oleic acid and ethylene diamine, together with 42 parts of sodium phenoxide, was dissolved in ethyl acetate to give a 50% solution. Thin films spread from this solution became flexible and infusible when baked for one hour at 150° C.

*Example XX*

To 50 parts of a 50% solution of the product of Example VI in methyl Cellosolve acetate was added 13.5 parts of a 7.4% solution of an amino-amide prepared from one mol of adipic acid and two mols of diethylene triamine in methyl ethyl ketone. Thin films spread from this solution became flexible and infusible when baked at 175° C. for 15 minutes.

In a similar manner, other amino-amides can be used with the complex epoxides, such as other amino-amides or amino-polyamides or polyamino-amides or poly-amino-polyamides, such as result from the amidification of polyamines, e. g. ethylene diamine or diethylene triamine or triethylene tetramine, with higher unsaturated or drying oil acids or resin acid, or with dimeric or other dibasic acids, to give amino-amides containing one or more amino groups and one or more amide groups, including straight chain monomeric and polymeric amino-amide products.

The new compositions made with amino-amides in suitable proportions form valuable protective layers and films when used either as clear varnishes or as pigmented varnishes, giving infusible films of remarkable resistance to chemicals and having other valuable, desirable properties.

Where the amino-amides are made from polyamines and drying oil acids, the new compositions made therewith have modified properties including drying properties or heat hardening properties due to reaction of the double bonds of the acid chains, as well as through reaction of the epoxides and amino and amide groups of the amino-amides.

The new compositions are useful in making molded objects and also in impregnating and laminating wood and fabrics and in making self-sustaining films and filaments, etc.

The new amino-amide-epoxy compositions may be pigmented with the usual pigments known to the protective coating industry to give enamels. The epoxide may be pigmented either before or after the amino-amide is added.

The new amino-amide-epoxy reaction products possess a high adherence to glass, metal, wood, and other surfaces and can be used to advantage in the lamination of glass or metal, in the lamination of wood to form plywood or other laminated wood products, etc.

This application is a continuation-in-part of my prior application Serial No. 632,595 (now Patent No. 2,589,245), filed December 3, 1945.

I claim:

1. Amino-amide epoxy compositions containing in substantial amounts complex resinous epoxides and amino amides, said amino amides containing at least one organic carboxylic acid amide group and at least one free amine group separated from said acid amide group and attached to a different carbon atom and said amino-amides containing at least three active hydrogens per molecule which are directly attached to nitrogen and said amino-amides being free from reactive groups other than amine and amide groups, said complex resinous epoxides being polymeric polyethers of dihydric phenols, which dihydric phenols are free from functional groups other than phenolic hydroxyl groups, said resinous epoxides having a plurality of aromatic nuclei alternating with intermediate and terminal aliphatic chains united through ether oxygen, the aromatic nuclei being the hydrocarbon nuclei of the dihydric phenols, the intermediate aliphatic chains being alcoholic-hydroxyl-containing chains free from functional groups other than alcoholic hydroxyl groups and the terminal aliphatic chains having epoxide and alcoholic hydroxyl groups and being free from other functional groups.

2. Amino-amide epoxy compositions as defined in claim 1 which also contains an alkaline catalyst.

3. Amino-amide compositions as defined in claim 1 in which the amino-amides are aliphatic carboxylic acid amides of aliphatic polyamines.

4. Amino-amide compositions as defined in claim 1 in which the amino-amides are polycarboxylic acid amides of aliphatic polyamines.

5. Amino-amide compositions as defined in claim 1 in which the amino-amides are partially amidified aliphatic polyamines, amidified with acids selected from the group which consists of drying oil acids, natural resin acids and polycarboxylic acids.

6. The process of forming complex heat-hardened amino-amide epoxy reaction products which comprises heating the composition of claim 1 to a high temperature.

7. The process of forming complex heat-hardened amino-amide epoxy reaction products which comprises heating the composition of claim 1 to a high temperature together with an alkaline catalyst.

8. Insoluble, infusible reaction products resulting from the heating at high temperatures of the amino-amide epoxy compositions of claim 1.

9. Insoluble, infusible reaction products resulting from the heating at high temperatures of the amino-amide epoxy compositions of claim 2.

10. Insoluble, infusible reaction products resulting from the heating at high temperatures of the amino-amide epoxy compositions of claim 3.

11. Insoluble, infusible reaction products resulting from the heating at high temperatures of the amino-amide epoxy compositions of claim 4.

12. Insoluble, infusible reaction products resulting from the heating at high temperatures of the amino-amide epoxy compositions of claim 5.

References Cited in the file of this patent
UNITED STATES PATENTS 2,626,223    Sattler et al. _____ Jan. 20, 1953